United States Patent [19]
Sherrill et al.

[11] 3,745,301
[45] July 10, 1973

[54] ELECTRIC BLANKET AND METHOD OF FORMING SAME

[75] Inventors: Ernest Kohn Sherrill; James M. Hall; Ralph G. Barnard, all of Rockingham, N.C.

[73] Assignee: Fieldcrest Mills, Inc., Eden, N.C.

[22] Filed: Nov. 12, 1971

[21] Appl. No.: 198,109

[52] U.S. Cl. ................ 219/212, 156/291, 219/529
[51] Int. Cl. ............................................. H05b 1/00
[58] Field of Search .................... 219/211, 212, 529; 156/291, 290; 161/148

[56] References Cited
UNITED STATES PATENTS

| | | | |
|---|---|---|---|
| 2,548,468 | 4/1951 | Grise | 156/291 X |
| 3,102,186 | 8/1963 | Owners | 219/212 |
| 3,313,668 | 4/1967 | Roullard | 156/291 |
| 3,634,163 | 1/1972 | Lamb | 156/291 |
| 3,047,444 | 7/1962 | Harwood | 156/291 X |

Primary Examiner—C. L. Albritton
Attorney—Donald M. Seltzer

[57] ABSTRACT

An electrically heated blanket and method of forming the same in which two layers of textile fabric are interconnected along spaced parallel lines by rows of small discrete dots of adhesive material to form a series of dividers with adjacent dividers defining parallel open-ended channels therebetween in which electric heating wire is positioned.

15 Claims, 8 Drawing Figures

Patented July 10, 1973

Patented July 10, 1973  3,745,301

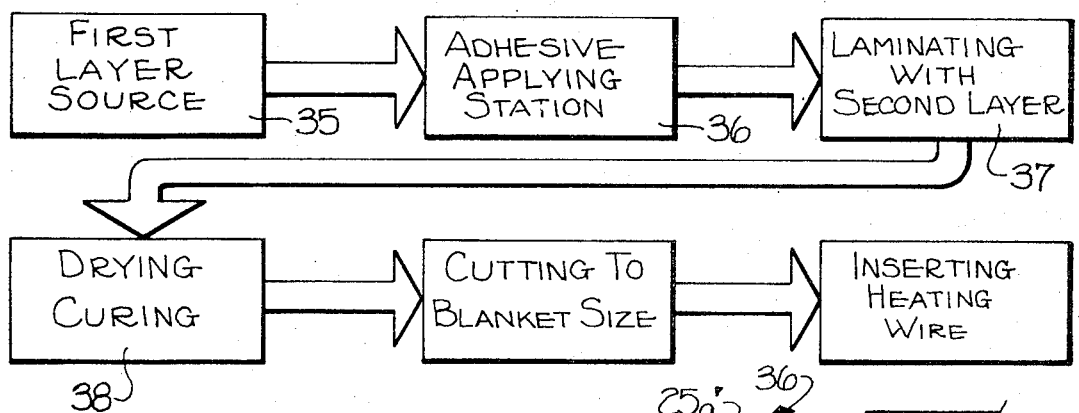
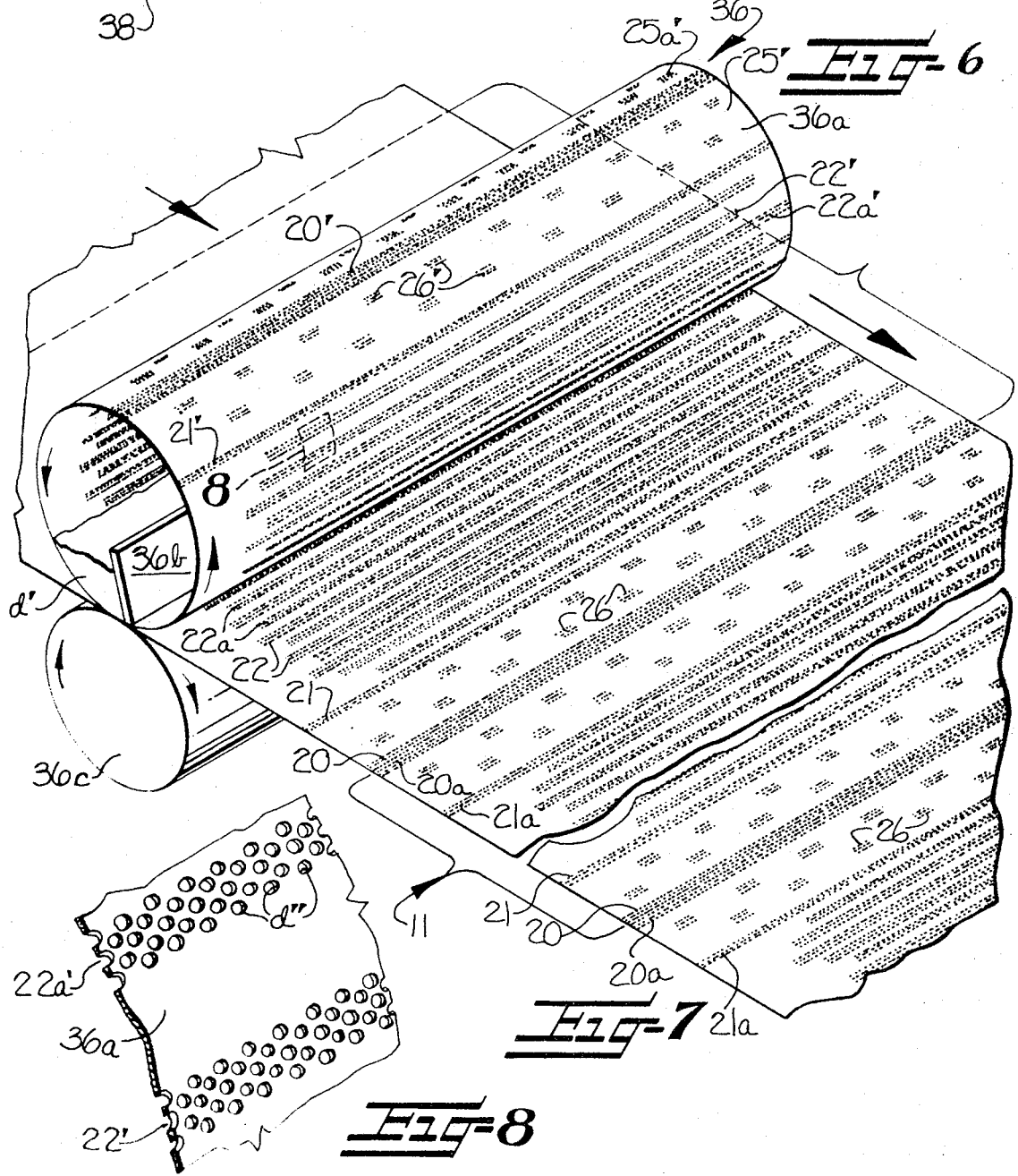

ELECTRIC BLANKET AND METHOD OF FORMING SAME

Conventionally, electric blankets are generally formed by weaving a two-ply fabric construction with parallel channels between the plies for receiving electric heating wire therein. A typical woven electric blanket is disclosed in Moberg's U.S. Pat. No. 2,203,918 for example. Shells for use in making electric blankets also have been formed by needle-laminating webs of nonwoven fibrous material along spaced parallel bands to define therebetween a plurality of channels for accommodating electric heating wire therein, as shown for example in Rentz' U.S. Pat. No. 3,431,611. Both of these known forms of blanket sheels are quite expensive to manufacture due to the necessarily relatively slow production capabilities of weaving looms and needling machines, and the complicated manner in which such equipment must be set up in order to obtain the desired channel arrangements in the blanket shell.

It is therefore an object of this invention to provide an improved electric blanket which may be economically produced, and the method of making the same, which facilitates the use of fabric layers of any desired textile material, such as nonwoven, knitted, and/or woven blanket materials, sheeting and the like, and wherein the layers are adhesively bonded together such that the blanket shell formed therefrom has a hand, drapeability, flexibility and other characteristics substantially similar to the characteristics of the individual fabric layers of the blanket shell.

It is therefore a more specific object of this invention to provide an improved electric blanket and method of making the same, wherein the shell of the blanket is formed of two layers of textile fabric interconnected along spaced parallel lines by rows of adhesive material to form a series of dividers with adjacent dividers defining parallel open-ended channels therebetween in which electric heating wire is positioned. The rows of adhesive material are in the form of small discrete dots of adhesive so that the presence of the adhesive material in the blanket has little or no noticeable stiffening affect on the fabric layers.

In the preferred embodiment of the electric blanket shell, each divider includes a plurality of rows of dots of adhesive material with the dots being arranged in spaced, staggered relationship. Also, each of the dots of adhesive is largely positioned between the two fabric layers and only superficially penetrates the fabric layers so as to provide a firm bond and so that the dots are not visible on the outer faces of the fabric layers.

It is still another object of this invention to provide a method of making electric blankets of the type described wherein the adhesive dots are applied by screen printing. Preferably, as illustrated, successive blanket shells are formed by directing a first fabric layer from a source into engagement with the peripheral surface of a rotating screen printing drum whose axial length is about equal to the width of the fabric layer and also equal to the length of each blanket shell being produced, and wherein the diameter of the peripheral surface of the printing drum is about equal to the width of each blanket shell being produced. The peripheral surface of the drum is provided with a plurality of circularly spaced, axially extending sets of small, discrete holes therethrough, each set of holes forming a distinct longitudinal band of holes in the peripheral surface of the drum, with all of the sets of holes collectively forming a pattern of such bands spaced around the printing drum. While an adhesive material is forced outwardly through the holes in the drum, the first fabric layer moving in engagement therewith receives deposits of such adhesive material thereon, which deposits are arranged in a pattern of raised dots of the adhesive material, and there being a complete pattern printed on the first fabric layer with each revolution of the drum. While the pattern of raised dots of adhesive material is being printed on the first fabric layer, a second fabric layer is directed from a source into superimposed contiguous relationship with that, surface of the first fabric layer to which the pattern of dots has been applied to adhesively bond the first and second fabric layers together along substantially parallel bands which define open-ended channels therebetween for receiving electric heating wire therein. Successive blanket shells may be formed in a continuous manner in that, while the thus joined portions of the fabric layers are subsequently being heated to effect drying and curing of the dots of adhesive thereon, a succeeding pattern or series of patterns may be printed on the first fabric layer. After the fabric layers are heated and the drying and curing of the dots of adhesive has been effected, the thus bonded together fabric layers are severed transversely thereof along lines corresponding to each successive pattern of the adhesive dots formed on the first fabric layer by the pattern drum to thus form each successive blanket shell. The electric heating wire may be inserted in the open-ended channels of the blanket shell either before or after the fabric layers are severed, as desired.

Some of the objects of the invention having been stated, other objects will appear as the description proceeds, when taken in connection with the accompanying drawings, in which FIG. 1 is a plan view of the preferred form of the electric blanket of this invention with the top fabric layer thereof broken away;

FIG. 6 is a block diagram of successive stages in the method of making electric blankets of this invention;

Figure 1:
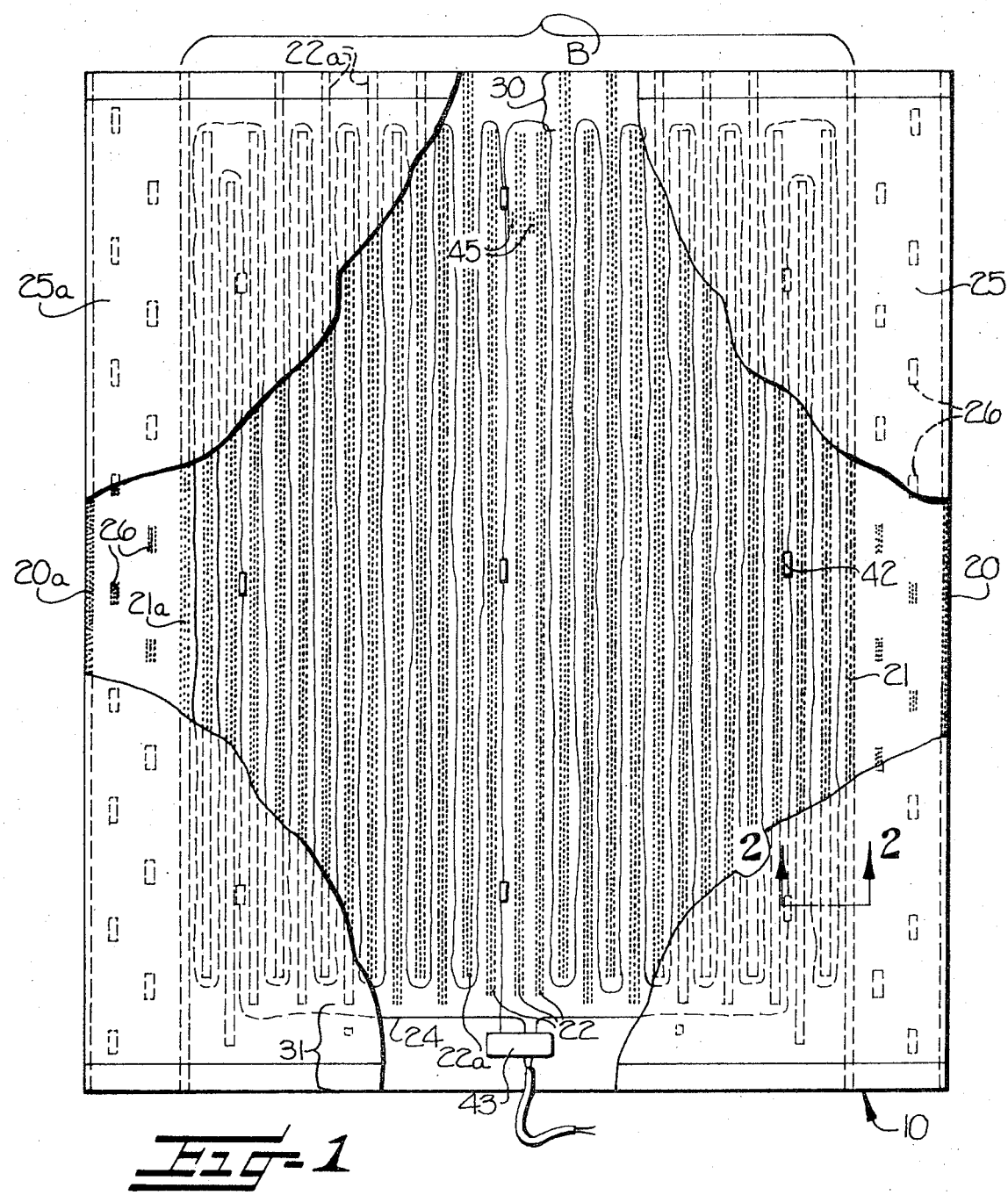

FIG. 7 is a schematic perspective view of the adhesive applying station showing how patterns of dots of adhesive material are applied to successive portions of one of the fabric layers of the electric blanket shell being formed and utilizing a rotary drum type of screen printing apparatus; and FIG. 8 is an enlarged fragmentary view of the area of the screen printing drum indicated at 8 in FIG. 7 and showing an arrangement of a few of the holes in the periphery of the drum which form the pattern thereon for the depositing of the raised dots of adhesive material on the corresponding fabric layer.

Referring more specifically to the drawings, in its preferred embodiment, the shell of the electric blanket 10 (FIGS. 1 – 5) comprises two opposing layers of textile fabric, the first or bottom layer of which is designated at 11 and the second or top layer of which is designated at 12. Each fabric layer 11, 12 may be of any material suitable as a bedcover. Also, it is contemplated that the two fabric layers 11, 12 may be of the same construction or of relatively different constructions. For example, each fabric layer may be in the form of any of the following constructions:

a. A needled nonwoven fibrous web or webs, with or without reinforcing yarns, rovings, slivers, or a woven or knitted scrim.
  b. A woven or tricot knit substrate having a polyurethane foam facing laminated thereon with flocked fibers adhering to the foam facing.
  c. A sliver knit web having a napped outer face.
  d. A woven or knitted terry web having a napped outer face.
  e. A woven blanket web having a napped outer face.
  f. Muslin, percale or other lightweight sheeting with or without flocked fibers adhering to the outer face thereof.
  g. A quilted textile web.
  h. A tufted material, napped or unnapped.

In the disclosed and preferred embodiment, each of the fabric layers 11, 12 comprises a nonwoven outer face web a (FIG. 5) of natural or synthetic staple fibers, such as rayon, wool, polyester or acrylic fibers or a combination thereof. Each fabric layer 11, 12 further comprises an inner face web b of a deregistered crimped spread tow of continuous synthetic filaments of polyester, acrylic or other suitable material.

Before the fabric layers 11, 12 are assembled to form the shell of the electric blanket 10, the webs a, b of each fabric layer 11, 12 are needled together so that they are coherently united by closely spaced needled fiber engagements n formed from the fibers of the outer web a extending through the webs a, b of each fabric layer. Each fabric layer 11, 12 should weigh in the range of about 3 to 6 ounces per square yard with the weight of the web b of crimped filaments being about 0.25 to 0.3 ounces per square yard and constituting about 5 to 10 percent of the total weight of each fabric layer 11, 12.

The crimped filaments in the inner face web b of each fabric layer 11, 12 should extend in a generally common direction widthwise of the respective layers and in random overlapping sinuous paths relative to each other with an average number of such filaments lengthwise of the blanket 10 being at least about one hundred per inch. The filaments should have crimps therein within the range of about 3 to 25 crimps per inch, and each of the filaments should be of a low denier within the range of about 0.8 to 15 denier. Fabric layers constructed in this manner are disclosed more in detail in the copending application of Ralph G. Barnard, Ser. No. 9,858, filed Feb. 10, 1970 and entitled NONWOVEN FABRIC AND METHOD OF MAKING SAME, with particular reference to FIG. 4A.

According to the invention, the fabric layers 11, 12 are interconnected along spaced substantially parallel lines by rows of small discrete dots d of adhesive material to form a series of dividers in the main body B of the blanket with adjacent dividers defining parallel open-ended non-adhesive zones or channels therebetween in which electric heating wire is positioned. To this end, each such parallel line includes a plurality of rows of the adhesive dots, and therefore each such plurality of rows is termed as a "band" of discrete dots of adhesive for the purpose of this disclosure.

The bands of adhesive dots d in the series of dividers are designated at 21, 21a, 22, 22a with all of the bands extending in what is generally considered the longitudinal direction of the electric blanket, although some blankets may be of greater width than the length thereof. The two outer bands 21, 21a defining the outer limits of the main body or heating area B of the electric blanket are spaced a substantial distance inwardly from the distal longitudinal side or selvage edges of the fabric layers 11, 12 and also serve as margin-defining bands extending substantially from one end to the other end of the blanket. The remaining divider bands in the main body B are shorter than the margin defining bands 21, 21a, with corresponding ends of the bands 22 being staggered with respect to adjacent ends of the bands 22a.

The distal longitudinal side edges of the fabric layers are also interconnected by respective selvage bands 20, 20a of rows of adhesive dots. The selvage bands 20, 20a and the respective margin-defining bands 21, 21a define therebetween respective longitudinally extending side marginal areas 25, 26a. A plurality of relatively small spaced apart bonding zones 26, each in the form of a short band or cluster the discrete dots d of adhesive material, may be provided for bonding the fabric layers 11, 12 together at spaced areas along the side marginal areas 25, 25a.

The opposite ends of blanket 10 include a foot area 30 and a head area 31, the latter areas extending throughout the width of the blanket and embracing corresponding portions of the side marginal areas 25, 25a and body B. As shown, in the foot area 30 of the blanket, corresponding ends of the three centermost divider bands 22 and the alternate divider bands 22 in opposite side portions of blanket body B are spaced substantially from the adjacent foot end edge of the blanket, while corresponding ends of all but two of the divider bands 22a disposed between the alternate divider bands 22 on opposite side portions of the blanket body B terminate at or closely adjacent the foot end edge of the blanket. The selvage bands 20, 20a and the margin-defining bands 21, 21a preferably extend throughout the length of the blanket, but the corresponding ends of all of the divider bands 22, 22a in the blanket body terminate in substantially spaced relation from the head end edge of the blanket, with the head ends of certain alternate bands 22 being staggered relative to the head ends of certain intervening bands 22a.

It is apparent that the ends of certain divider bands 22, 22a terminate inwardly of others of the divider bands in a predetermined pattern arrangement so as to shield adjacent loops of the heating wire 24 where it extends around the ends of the corresponding divider bands and to facilitate threading the wire 24 into the channels 23 after the blanket shell has been formed.

Figure 5:
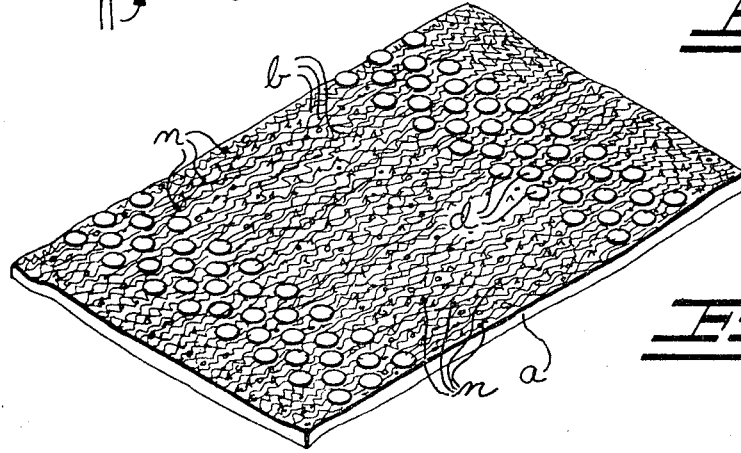
FIG. 5 is an enlarged fragmentary view of a portion of one of the layers of fabric with portions of two adjacent bands of dots of adhesive material applied thereto.

In order to bond the fabric layers 11, 12 together without imparting undesirable stiffness of the fabric layers, while ensuring that the usual threading needle or other implement will be properly guided along channel 23 without rupturing the bond between layers 11, 12 during insertion of the heating wire 24 therein, the adhesive dots $d$ in each band 20, 20a, 21, 21a, 22, 22a, 26 should be of substantially lesser diameter than the width of each band with a asmall space between adjacent dots. For example, the dividers formed by the divider bands 22, 22a preferably are aout one-half to three-fourths inch wide with the channels 23 being about 1¼ to 1½ inches wide. Therefore, the adhesive dots $d$ forming each band preferably are about five thirty-seconds to one-fourth inch in diameter or of equivalent area and are arranged in closely spaced, staggered relationship along each band, although it is apparent that certain dots $d$ are collectively positioned in longitudinal rows defining opposite longitudinally edges of each band, as best shown in FIG. 5. The distance between adjacent dots $d$ may be about one-half of the diameter of each dot and may vary between about one-sixteenth and one-eighth inch.

Figure 4:
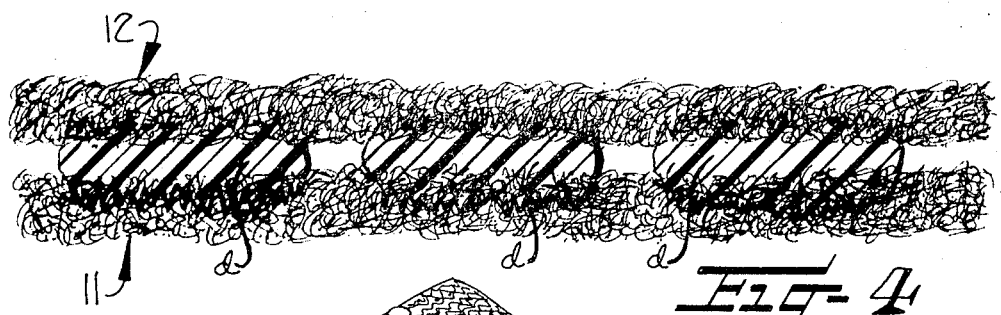
FIG. 4 is a further enlarged transverse sectional view of the area of the fabric indicated at 4 in FIG. 2, and showing corresponding dots of the adhesive material largely disposed between the opposing layers of a nonwoven textile fabric and only superficially penetrating the layers of fabric.

Referring to FIG. 4, it will be observed that each dot $d$ of adhesive material is raised with respect to the fabric layers 11, 12; i.e., each dot $d$ is in the form of a thin film or wafer of adhesive material largely positioned between the fabric layers and only superficially penetrating the fabric layers so that the adhesive materail does not bleed through to the outer faces of the fabric layers. Thus, if the adhesive material is of a different color or shade than the fabric layers or if any discoloration of the dots $d$ occurs during drying and curing of the blanket shell, the dots $d$ will not be visible exteriorly of the blanket and will not adversely affect the appearance of the blanket.

Figure 2:
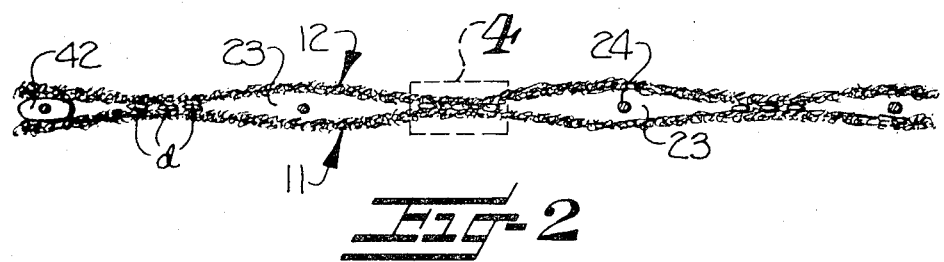
FIG. 2 is a greatly enlarged, fragmentary sectional view taken substantially along line 2—2 in FIG. 1.
Figure 3:
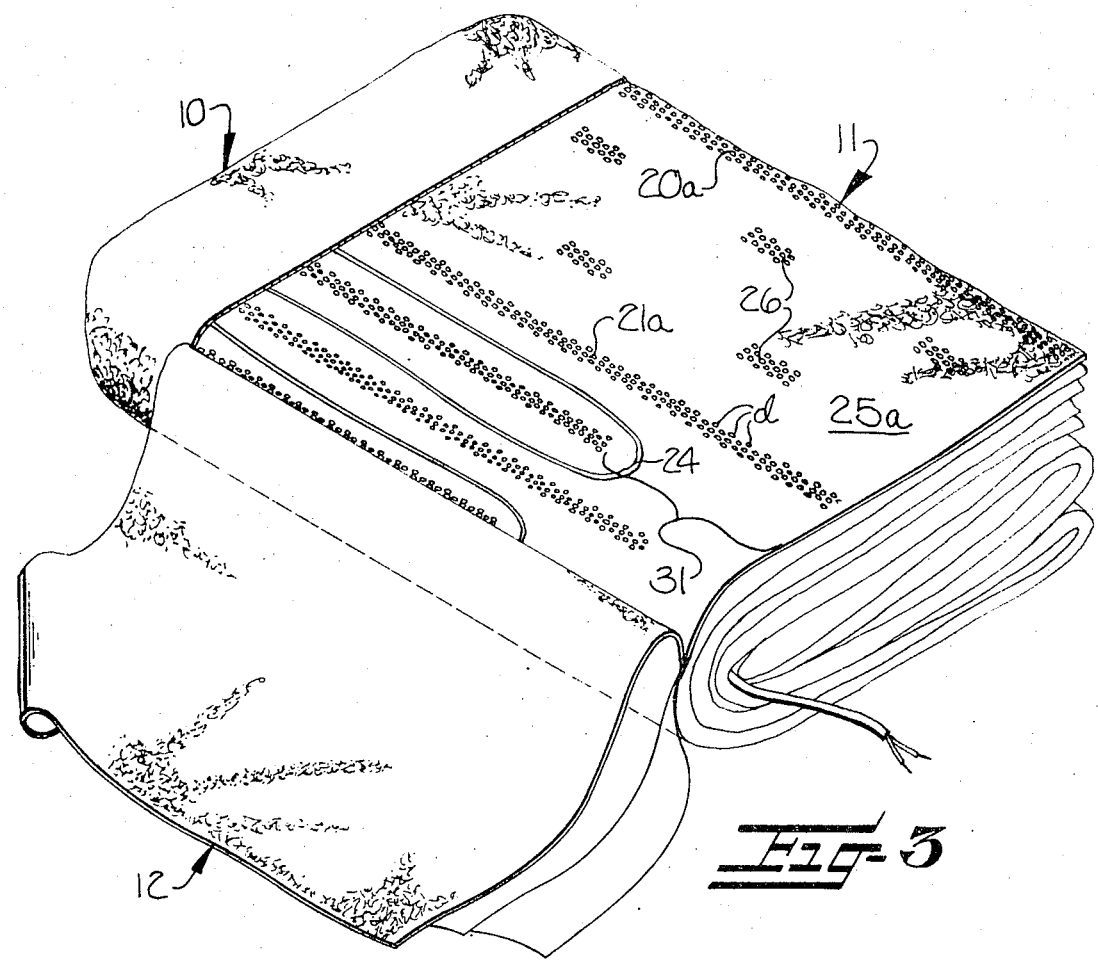
FIG. 3 is an enlarged perspective view of the electric blanket shown in FIG. 1, showing the same in folded condition and with one of the fabric layers broken away to show some of the rows of small discrete dots of adhesive material on the other layer for bonding the layers together.

Also, the bond between the fabric layers 11, 12 along the dividers defining the open-ended channels 23 must be of such strength that it will not rupture during insertion of the usual needle or other implement employed to thread the electric heating wire 24 through the channels. During experiments, it was found that, even with substantial penetration of the fabric layers by the adhesive material, if there was not a definite mass or thickness of the adhesive dots $d$ between the fabric layers, as shown in FIGS. 2 and 4, the desired bond strength was not obtained and at least partial delamination of the layers was easily effected by the wire-threading implement in normal use of the same. However, by providing a definite mass or thickness of several mils of the adhesive material of dots $d$ between the fabric layers, bonding strength was increased substantially and the delamination problem was solved. Of course, the amount of adhesive material in each dot $d$ will vary according to the porosity of the fabric layers. It is apparent that a relatively porous or uneven fabric layer such as a needled nonwoven fabric of staple fibers requires a greater amount of adhesive material in each dot $d$ than a tightly woven or knitted fabric layer, for example, depending upon the rheological properties or viscosity of the adhesive material during laminating of the fabric layers.

Therefore, the adhesive material should be of a type which will assume a raised configuration on the surface of the first fabric layer 11, when deposited thereon in the form of the dots $d$, and which will not spread out or splay to any substantial degree upon being deposited and upon the second fabric layer 12 subsequently being superimposed on the first fabric layer 11. Certain synthetic resins; e.g., acrylic and polyvinyl acetate-acrylic copolymers, have been used as the adhesive material forming the dots $d$ and have resulted in the fabric layers 11, 12 being firmly bonded together and in the blanket having the desired characteristics of hand, drapeability and flexibility mentioned earlier herein.

Representative formulations of adhesive materials of which the dots $d$ may be formed are as follows:

FORMULA A 1. 88.9% Vinyl-acrylic copolymer,
2. 7.0% Urea-formaldehyde thermosetting resin,
3. 3.5% Acrysol ASE–60, an alkali-soluble acrylic emulstion, and
4. 0.6% ammonia (28%) $NH_4OH$.

FORMULA B 1. 95.4% liquid rubber latex,
2. 4.0% Acrysol ASE–60, and
3. 0.6% ammonia (28%) $NH_4OH$.

FORMULA C 1. 47.0% E–358
2. 48.4% E–32, a self-crosslinking acrylic emulsion,
3. 4.0% Acrysol ASE–60, and
4. 0.6% ammonia (28%) $NH_4OH$.

All percentages in the above formulations are by weight. The Acrysol ASE–60, the E–32 and the E–358 are products of the Rohm and Haas Company. Formula A is a product of C. L. Hauthaway and Sons, with a research designation of XJ2–262D, Parts I and II. Formula B is a product of General Latex Company known as "Vultex 14VX3017."

It is preferred that any liquid adhesive materials used in forming the adhesive dots $d$ on the first fabric layer 11 should have a viscosity in the range of about 30,000 to 120,000 cps (No. 6 Spindle at 10 rpm on a Brookfield RVF Viscometer). The liquid adhesive material should have a short rheology, it should be capable of retaining stable viscosity for periods of one to two months at normal room terrmperatures, and it should be capable of drying and curing in about 3 to 8 minutes at temperatures of about 200° to 300° F.

In experimental blanket shells made according to the invention the strength of the bond effected between the fabric layers 11, 12 by the adhesive dots $d$ in the various bands 20, 20a, 21, 21a, 22, 22a, 26 was determined by utilizing a conventional Scott Tester whose jaws were set 2¼ inches apart, with readings being taken at a spacing of 3 inches between the jaws. It was found that the bond ruptured when the two layers were pulled in opposite directions relative to each other in parallel relation to the channels 23 at tensile forces of between about 3.4 to 7 pounds being applied by the jaws of the Scott Tester. It was also found that the bond ruptured when the force was applied crosswise of the direction of the channels 23 when tensile forces of between about 15 to 32 pounds were applied to the jaws of the Scott Tester. These breaking strengths are well within the desired range.

According to the method, as shown in the block diagram of FIG. 6, a first layer 11 of the textile fabric, from which a plurality of the blankets 10 of FIG. 1 is to be formed, is directed from a suitable source 35 through an adhesive applying station 36, where successive blanket patterns of the rows of adhesive dots $d$ are deposited on the first fabric layer 11 as will be explained later in detail. The first layer 11, with the corresponding patterns of adhesive dots $d$ thereon in a liquid state, then passes through a laminating station 37 which may be in the form of a pair of advancing rollers, not shown, where a second layer 12 (FIGS. 1–4) of the textile fabric is directed downwardly, onto and thus advanced with the first layer 11, thereby bringing the top layer 12 into superposed contacting relation against the upper surface of the first or bottom layer 11 to laminate the first and second layers together.

The two thus laminated layers of fabric 11, 12 then advance through a suitable drying and curing station 38 which may be in the form of a conventional tenter-equipped drying oven. The two superposed layers 11, 12 then are subjected to elevated temperatures of about 200° to 300° F. for about 3 to 8 minutes, depending upon the type and amount of adhesive material being used. Thereafter, the two layers 11, 12 are severed transversely thereof to separate successive blanket size portions of the layers 11, 12 from the major portions thereof. Either before or after the blanket size portions of layers 11, 12 are formed, the electric heating wire 24 is inserted in the channels 23 of the blanket body B in substantially the manner shown in FIG. 1.

Of course, where desired, suitable thermostats 42 may be interposed in the heating wire 24. The usual electrical connector 43 has the electric wire 24 connected thereto and is positioned adjacent the central portion of the foot end area 31 of the blanket 10. As shown, by way of example, three of the thermostats 42 are positioned in one of the centrally located channels 23 and three of the thermostats 42 are positioned in each of two of the channels 23 located adjacent the outer side portions of the blanket body B. If so desired, in order to stabilize the thermostats in the blanket, one or more of the channels 23 may be restricted by a relatively short restricting band or cluster 45 of the adhesive dots $d$ projecting from a corresponding one of the divider bands 22 as shown, for example, in the upper central portion of FIG. 1.

As shown in FIG. 7, the adhesive applying station 36 is in the form of a screen printing apparatus including a rotating screen or drum 36a having a perforated pattern thereon and which is engaged by the first fabric layer 11 passing therebeneath. A supply of adhesive material $d'$, in liquid form, is contained in the rotating screen 36a behind a stationary squeegee or doctor blade 36b. A back-up roll 36c may be positioned beneath the rotating screen 36a for maintaining the fabric layer 11 passing therebetween in engagement with the rotating screen 36a.

The peripheral surface of the rotating screen 36a is provided with a pattern of perforations or holes $d''$ (FIG. 8) which corresponds with the pattern of deposits or dots $d$ to be deposited on each length of the layer of fabric 11 shown in FIG. 7 corresponding to the width of a single blanket to be produced therefrom. Thus, the axial length of rotating screen 36a is about equal to the width of the first fabric layer 11 and also is about equal to the length of each blanket shell being produced. Further, the diameter of the peripheral surface of the rotating screen is equal to the width of each blanket shell being produced. Since the arrangement of the holes in the peripheral surface of the rotating screen 36a corresponds to the desired pattern to be printed on a single blanket shell section of the layer 11 in FIG. 7, the peripheral wall of the rotating screen 36a, with the possible exception of the relatively small areas of holes formed therein corresponding to the small bondong zones 26 to be provided in the marginal areas 25, 25a of the laminated blanket shell. Those bands of holes $d''$ in rotating screen 36a and adjacent imperforate areas which are shown in FIGS. 7 and 8 and which correspond to the pattern of FIG. 1 will bear the same reference characters, where applicable, with the prime notation added.

It will be observed in FIG. 7 that the rotating screen 36a is provided with a relatively wide band 20' of the spaced holes $d''$ throughout the length thereof and defining the juncture of adjacent marginal areas 25', 25a' on the periphery of rotating screen 36a. Thus, when the adhesive material $d'$ is being deposited on the fabric layer 11 through the band 20' of holes $d''$, the band 20' forms both of the selvage bands 20, 20a of adhesive dots $d$ at the juncture of two immediately succeeding blanket forming sections of the first fabric layer 11. It is preferred that the second fabric layer 12 is directed into contact with the first fabric layer 11 closely adjacent and downstream of the rotating screen 36a while a succeeding portion of the first fabric layer is being printed by the rotating screen 36a, whereupon the thus laminated fabric layer 11, 12 may pass directly through the drying and curing stage 38. Also the roll employed for bringing the top fabric layer into contact with the bottom fabric layer should be spaced from the bottom fabric layer sufficiently to ensure that the top fabric layer engages the bottom fabric layer under relatively light pressure at least until the adhesive dots $d$ have set sufficiently so that they will not spread out to any noticeable extent or bleed through to the outer faces of the fabric layers. This also ensures that adjacent dots $d$ are spaced apart so that they will not impart undesirable stiffness to the fabric layers.

It is apparent that, either before or after insertion of the electric heating wire 24, each successive blanket shell thus formed is separated from the remaining portions of the fabric layers 11, 12 by severing the layers 11, 12 substantially along the longitudinal center of the wide band of adhesive dots forming the adjacent selvage bands 20, 20a. If desired, suitable indicia may be provided on one or the other or both of the fabric layers 11, 12 as they are brought together at the latter wide bands to identify the line along which the layers are to be severed following the drying and curing operation.

In practice, a rotating printing screen or drum 36a was used which had a peripheral wall of 18 gauge stainless steel, and each of the holes $d''$ therethrough was about 7/32 inch diameter. The wet adhesive material $d'$ forced outwardly through the holes $d''$ by blade 36b formed dots $d$ of about 3/16 inch diameter and of generally conical shape about one-eighth inch high, but which flattened out somewhat and superficially penetrated the proximal portions of the fabric layers 11, 12 upon lamination the fabric layers 11, 12 leaving a definite mass or thickness of the adhesive material in the dots $d$ separating the immediate areas of the fabric layers superficially penetrated thereby.

In the drawings and specification there has been set forth a preferred embodiment of this invention and, although specific terms are employed, they are used in a descriptive and generic sense only and not for purposes of limitation.

That which is claimed is:

1. An electrically heated blanket comprising two layers of textile fabric interconnected throughout major portions thereof along a series of spaced parallel lines by discontinuous adhesive material to form a series of dividers with adjacent dividers defining parallel channels therebetween, with opposite ends of the channels being unobstructed and open-ended, and electric heating wire positioned in said channels.

2. An electrically heated blanket comprising two layers of textile fabric interconnected throughout major portions thereof along a series of spaced parallel lines by rows of small discrete dots of adhesive material to form a series of dividers with adjacent dividers defining parallel channels therebetween, with opposite ends of the channels being unobstructed and open-ended, and electric heating wire positioned in said channels.

3. An electrically heated blanket according to Claim 2, wherein each of said fabric layers comprises a needled nonwoven web of staple fibers forming an outer face thereof.

4. An electrically heated blanket according to claim 2, wherein each of said fabric layers comprises an outer web of staple fibers, an inner web of crimped continuous synthetic filaments, and needled fiber entanglements uniting the respective webs of each fabric layer together.

5. An electric blanket shell comprising two layers of textile fabric interconnected throughout major portions thereof along a series of spaced parallel lines by discontinuous adhesive material to form a series of adjacent dividers defining parallel channels therebetween, with opposite ends of the channels being unobstructed and open-ended and adapted to receive electric heating wire therein.

6. An electric blanket shell comprising two layers of textile fabric interconnected throughout major portions thereof along a series of spaced parallel lines by rows of small discrete dots of adhesive material to form a series of dividers with adjacent dividers defining parallel channels therebetween, with opposite ends of the channels being unobstructed and open-ended to receive electric heating wire therein.

7. A blanket shell according to claim 6, wherein each divider comprises a plurality of rows of said dots of adhesive material.

8. A blanket shell according to claim 6, wherein said dots of adhesive in each divider are arranged in staggered relationship.

9. A blanket shell according to claim 6, wherein each of said dots of adhesive is a cured acrylic adhesive material.

10. A blanket shell according to claim 6, wherein each of said dots of adhesive is a cured polyvinyl acetate-acrylic copolymer adhesive material.

11. A blanket shell according to claim 6, wherein each of said dots is largely disposed between the fabric layers and only superficially penetrates into the fabric layers.

12. A blanket shell according to claim 6, including rows of discrete dots of adhesive material spaced outwardly from and extending parallel with said series of dividers and bonding opposing side edge portions of said layers together and extending substantially from one end to the opposite end of said shell.

13. A blanket shell according to claim 6, wherein at least most of said dividers are arranged relative to each other with their ends in staggered relationship.

14. A blanket shell according to claim 6, wherein each of said fabric layers comprises a needled nonwoven web of staple fibers forming an outer face thereof.

15. A blanket shell according to claim 6, wherein each of said fabric layers comprises an outer web of staple fibers, an inner web of crimped continuous synthetic filaments, and needled fiber entanglements uniting the respective webs of each fabric layer together.

* * * * *

UNITED STATES PATENT OFFICE
CERTIFICATE OF CORRECTION

Patent No. 3,745,301          Dated July 10, 1973

Inventor(s) E. Kohn Sherrill, James M. Hall and Ralph G. Barnard

It is certified that error appears in the above-identified patent and that said Letters Patent are hereby corrected as shown below:

Column 1, Line 14, "sheels" should be --shells,
Column 4, Line 30, "26a" should be --25a--
Column 5, Line 25, "materail" should be --material--
Column 7, Line 68, "bondong" should be --bonding--

Signed and sealed this 27th day of November 1973.

(SEAL)
Attest:

EDWARD M. FLETCHER, JR.
Attesting Officer

RENE D. TEGTMEYER
Acting Commissioner of Patents